United States Patent Office 3,301,140
Patented Jan. 31, 1967

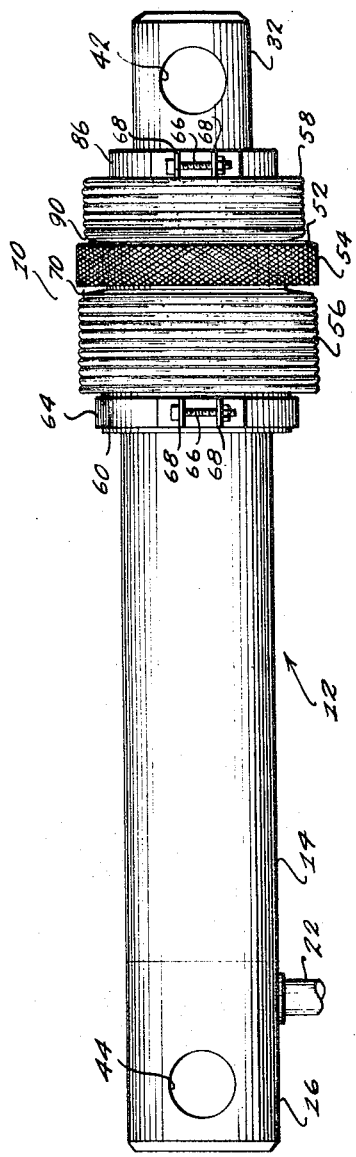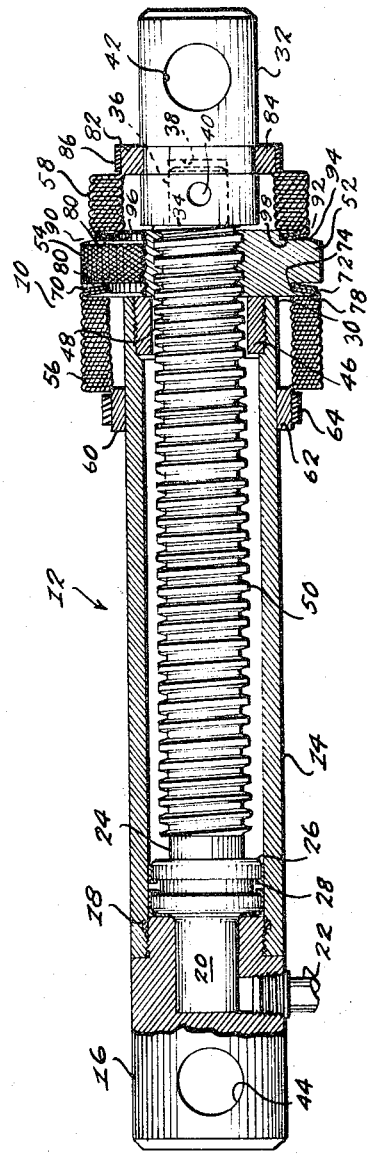

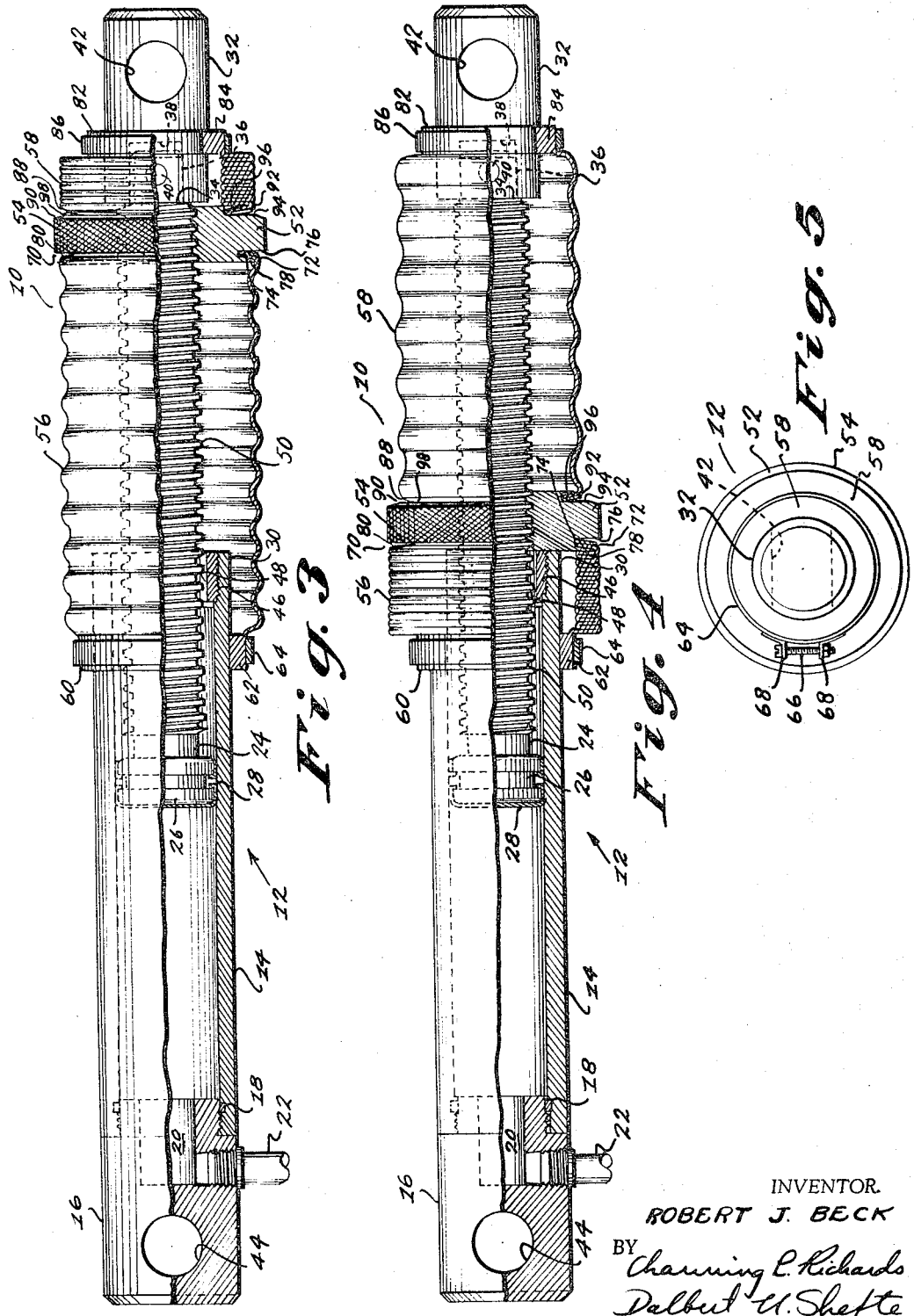

3,301,140
EXPANSIBLE SHIELDING MEANS
Robert J. Beck, Charlotte, N.C., assignor to Duff-Norton Company, Charlotte, N.C., a corporation of North Carolina
Filed May 3, 1965, Ser. No. 452,707
7 Claims. (Cl. 92—13)

The present invention relates to expansible shielding means for protecting the components of an operating mechanism, and more particularly to an expansible shielding means of compact and simple construction that is easily assembled with the mechanism components and is uniquely arranged to shield the mechanism components while accommodating relative rotation of the components.

Briefly described, the shielding means of the present invention is adapted for use with a mechanism of the type in which one component moves linearly with respect to another component and is capable of relative rotation about the axis of linear movement, with the shielding means having an expansible shield member enclosing the adjacent portions of these components and being fixed in sealing disposition about the periphery of one component and being connected to the other component by means formed in the periphery of the other component for receiving and retaining the shield member in sealing disposition during linear movement of the component, while permitting relative rotation of the component with respect to the shield member.

In the preferred embodiment of the present invention, the shielding means is incorporated in a cylinder-piston mechanism of the type in which the piston component has a threaded portion that carries a stop nut for adjustable positioning against the cylinder component to stop the retraction of the piston component at a selected position. To provide adequate shielding protection for the connecting portions of the components and for the threaded portion of the piston component as well, while leaving the periphery of the stop nut accessible for manipulation, the shielding means is composed of a pair of linearly expansible cylindrical shield members, one of which has an end fixed to the cylinder component and extends to the stop nut to enclose the end of the cylinder component and the adjacent portion of the piston component inwardly of the stop nut, and the other shield member has an end fixed to the piston component outwardly of the threaded portion and extends to the stop nut to enclose the threaded portion of the piston component beyond the stop nut. These cylindrical shield members are preferably formed of flexible material in bellows-like expansible circumferential folds, with the end folds serving as convenient flanges for receipt in annular grooves formed in the periphery of the stop nut at the ends thereof, each groove providing opposed upstanding shoulders between which the shield member end fold is retained in sealing disposition on the stop nut during linear and rotational movement of the stop nut, while the stop nut remains exposed for manipulating access. With this arrangement a simple and compact shielding means is provided that can be easily adapted to a mechanism of the desecribed type simply by forming suitable grooves in the stop nut, and can be easily attached by clamping to the cylinder and piston components and slipping the end flaps into the stop nut grooves.

These and other features of the present invention are described at length below in relation to the preferred embodiment illustrated in the accompanying drawings, in which:

FIG. 1 is an elevational view of a hydraulic ram unit embodying the shielding means of the preferred embodiment of the present invention, showing the elements in retracted position;

FIG. 2 is a partial sectional view corresponding to FIG. 1;

FIG. 3 is a partial sectional view similar to FIG. 2, showing the elements in extended position;

FIG. 4 is a partial sectional view similar to FIG. 3, showing the stop nut in piston positioning disposition; and FIG. 5 is an end view as viewed from the right in any of the preceding figures.

In the illustrated embodiment, the shielding means 10 of the present invention is incorporated in a hydraulic ram mechanism 12 of the type used to position a load and hold it in such position for a period of time. For example, a set of these hydraulic ram mechanisms can be used to elevate a vehicle from support on its wheels to a rigid stationary position at which the vehicle is retained by the ram mechanisms until it is again desired to mobilize the vehicle.

The ram mechanism 12, apart from the shielding means 10 of the present invention, may be of any known construction. The mechanism illustrated comprises a cylinder component 14 in one end of which a base component 16 is threadably seated with a suitable sealing ring 18 at the threaded connection. The base component 16 has a port 20 to which a conduit 22 is attached leading from a source of hydraulic pressure (not shown) and which port 20 communicates with the interior of the cylinder component 14 to provide hydraulic motivation of a piston component 24 that is slidably carried in the cylinder component 14 and has a piston head 26 at its inner end around which a sealing ring 28 is mounted to prevent leakage of the hydraulic fluid beyond the piston head 26 and thereby confining the hydraulic pressure to act against the piston head to extend the piston component 24 from the cylinder component 14 or to prevent retraction of the piston component when supporting a load at a desired position.

The piston component 24 extends from the open outer end 30 of the cylinder component 14 for attachment to a work supporting head 32 that seats on a shoulder 34 of the piston component 24 and receives the reduced diameter plug end 36 of the piston component 24 in a bore 38, to which plug end 32 the work supporting head is secured by a lock pin 40. The work supporting head 32 is further formed with a transverse bore 42 for attachment to a load or to a suitable intermediate fitting. A similar transverse bore 44 is formed in the base component 16 for attachment to a frame or appropriate fitting.

The piston component 24 is maintained in axial disposition with respect to the cylinder component 14 by an annular gland nut 46 that is threaded in the outer end 30 of the cylinder component and has a smooth cylindrical inner surface 48 in which the portion 50 of the piston component 24 intermediate the piston head 26 and the work supporting head 32 is slidably supported.

This intermediate portion 50 of the piston component 24 is threaded and carries a stop nut 52 thereon outwardly of the cylinder component 14 for tightening against the outer end 30 of the cylinder component to stop retraction of the piston component 24 into the cylinder component at a selected position. Thus, when the piston component 24 is extended by the hydraulic pressure to position a load as desired, tightening of the stop nut 52 against the cylinder component outer end 30 will positively retain the load at the desired position for a prolonged period of time regardless of possible reduction in the hydraulic pressure due to leakage in the system or any other cause. This tightening, as well as subsequent loosening, of the stop nut 52 is accomplished manually by engagement of the periphery 54 of the nut, which is knurled to facilitate manipulation.

In such a hydraulic ram mechanism it is usually desirable to shield the operating portions, such as the connection of the piston component 24 in the outer end 30 of the cylinder component 14 and the threaded portion 50 of the piston component 24 on which the stop nut 52 is manipulated, from weather and foreign matter, particularly where the ram mechanism is used on a vehicle and would be subjected to large concentrations of dust, mud and other harmful material. However, conventional shielding means would not be suitable as the periphery of the stop nut 52 must remain exposed for manipulating access, and as the stop nut rotates with respect to the adjacent cylinder component 14 and piston component 24, a connection of the shielding means that will allow rotation must be effected.

By the present invention, shielding means 10 are provided that protect the mechanism between spaced portions, the end 30 of the cylinder component 14 and the work supporting head 32 on the piston component 24, while allowing an intermediate element, the stop nut 52, to rotate and yet be exposed for manipulating access. This shielding means of the illustrated embodiment includes a pair of cylindrical shield members 56 and 58 of flexible material, such as a molded composition sheet of plastic with a canvas base, formed in bellows-like expansible folds. One shield member 56 has an inner end 60 formed with an annular mounting pad 62 that is fixed to the cylinder component 14 adjacent the cylinder component outer end 30 by an annular metal rim clamp 64 that has a tangential tightening screw 66 that draws outstanding flanges 68 toward each other to draw the clamp 64 tightly about the mounting pad 62 and thereby fix the shield member 56 on the cylinder component 14. This first or inner shield member 56 extends coaxially with the ram mechanism to an end fold 72 thereof that serves as an inwardly extending annular flange for connection to the stop nut 52, which is formed with an annular groove 70 in its periphery at the end thereof adjacent the cylinder component 14. This groove 70 is of a depth sufficient to receive the end fold 72 of the inner shield member 56 and provides opposed upstanding shoulders 74 and 76 between which the shield member end fold 72 is retained in sealing disposition, the shoulders being spaced sufficiently in relation to the thickness of the shield member material to allow substantially unrestricted rotation of the stop nut 52 with respect to the shield member 56. The end wall 78 of the stop nut 52 beyond the groove 70 is formed relatively thin and of a restricted diameter with respect to the shield member 56 to permit mounting of the shield member end fold 72 thereover and retaining it in seating disposition thereon after mounting while allowing substantially unrestricted rotation. Preferably, the shield member 56 has a flat annular reinforcing ring 80 of material such as neoprene cemented to the end fold 72 to increase the ability of the shield member 56 to remain connected to the stop nut 52 when extended, and the spacing of the groove shoulders 74 and 76 is such as to accommodate the extra thickness resulting from this reinforcing ring 80.

The other shield member 58 is similarly mounted outwardly of the stop nut 52 to enclose the threaded portion 50 of the piston component 24 extending beyond the nut. This other or outer shield member 58 has an outer end 82 formed with an annular mounting pad 84 fixed to the work supporting head 32 on the piston component 24 by a rim clamp 86 identical to the aforementioned clamp 64, and the shield member 58 extends inwardly to the stop nut 52 to which it is attached by a similar end fold 88 and groove 90 connection at the outer end of the stop nut periphery 54 with the stop nut periphery remaining exposed between grooves 70 and 90. The latter groove 90 also provides upstanding retaining shoulders 92 and 94 and an end wall 96 proportioned in relation to the outer shield member end fold 88 the same as the previously described groove 70, shoulders 74 and 76 and end wall 78 are related to the inner shield member end fold 72, with the end fold 88 similarly reinforced by a flat annular reinforcing ring 98.

With this shielding means arrangement, shielding is maintained throughout operation of the ram mechanism. Initially, the elements are in the retracted position of FIGS. 1 and 2, with the shield members 56 and 58 compressed. When hydraulic pressure is introduced into the cylinder component 14, the piston component 24 is forced outwardly, carrying the stop nut 52 with it and thereby expanding the inner shield member as shown in FIG. 3. The piston component 24 is then retained in a desired extended position by screwing the stop nut 52 on the threaded portion 50 until it is seated against the cylinder component outer end 30, which movement of the stop nut 52 compresses the inner shield member 56 and expands the outer shield member 58. When it is desired to retract the piston component, the stop nut 52 is loosened away from the cylinder component. During all of this manipulation, the shielding means 10 continues to shield the enclosed portions while leaving the stop nut accessible for manipulation.

The shielding means is of simple construction, and can be adapted to a mechanism of the type described simply by forming the described grooves 70 and 90 in the stop nut 52. Assembly is easily accomplished during assembly of the ram mechanism simply by clamping the shield members 56 and 58 to the cylinder component 14 and work supporting head 32, respectively, with the rim clamps 64 and 86 prior to assembly of the piston component 24 in the cylinder component 14, and then sliding the end folds 72 and 88 over the respective stop nut end walls 78 and 96 after the nut, piston component and cylinder component have been assembled.

The present invention has been described in detail above for purposes of illustration only and is not intended to be limited by this description or otherwise except as defined in the appended claims.

I claim:
1. In a mechanism of the type having spaced portions between which an intermediate element is provided with means for mounting said element for linear as well as rotary movement with respect to the axis of linear movement, shielding means comprising a pair of linearly expansible shield members enclosing the mechanism between said spaced portions and the intermediate element, each said shield member having an end fixed to the periphery of one of said spaced portions, and means formed in the periphery of said intermediate element at opposite ends thereof for receiving and retaining the other ends of said shield members in sealing disposition, said receiving and retaining means retaining said shield member rotatably for relative rotation of said intermediate element with respect to said shield member at said receiving and retaining means.

2. In a mechanism of the type having spaced portions between which an intermediate element is provided with means for mounting said element for linear as well as rotary movement with respect to the axis of linear movement, shielding means according to claim 1 and characterized further in that each said means for receiving and retaining the other ends of said shield members is a circumferential groove formed in the periphery of said intermediate element to receive the respective shield member end and providing opposed shoulders between which said shield member end is retained in sealing disposition during linear and rotational movements of said intermediate element.

3. In a mechanism of the type having spaced portions between which an intermediate element is provided with means for mounting said element for linear as well as rotary movement with respect to the axis of linear movement, shielding means according to claim 2 and characterized further in that each said shield member is formed of flexible material in bellows-like expansible folds and in that said circumferential groove receives and retains an end fold of said shield member.

4. In a cylinder-piston mechanism of the type having a cylinder component with an open end in which a piston component reciprocates and wherein the piston component has a threaded portion that carries a stop nut for adjustable positioning against the cylinder component to stop retraction of the piston component in a selected position, shielding means comprising a pair of linearly expansible cylindrical shield members protectively enclosing the open end of said cylinder component and the threaded portion of the piston component, one of said cylindrical shield members having an end fixed to the periphery of said cylinder component adjacent said open end thereof, the other of said cylindrical shield members having an end fixed to the periphery of said piston component outwardly of said threaded portion thereof, and means formed in the periphery of said stop nut at opposite ends thereof for receiving and retaining the other ends of said shield members in sealing disposition, said means for receiving and retaining said shield members retaining said shield members rotatably for relative rotation of said nut with respect to said shield members at said receiving and retaining means.

5. In a cylinder-piston mechanism of the type having a cylinder component with an open end in which a piston component reciprocates and wherein the piston component has a threaded portion that carries a stop nut for adjustable positioning against the cylinder component to stop retraction of the piston component at a selected position, shielding means according to claim 4 and characterized further in that each of said means for receiving and retaining said other ends of said shield members is an upstanding annular retaining shoulder formed at the end of said stop nut and an inwardly extending annular flange on each said shield member seated over said retaining shoulder and slidable circumferentially thereon to accommodate rotation of said stop nut.

6. In a cylinder-piston mechanism of the type having a cylinder component with an open end in which a piston component reciprocates and wherein the piston component has a threaded portion that carries a stop nut for adjustable positioning against the cylinder component to stop retraction of the piston component at a selected position, shielding means according to claim 4 and characterized further in that said means for receiving and retaining said other ends of said shield members is an annular groove formed in the periphery of said stop nut at each end thereof to receive said other ends of said shield members, each said groove providing opposed upstanding shoulders between which the shield member end is retained in sealing disposition during linear and rotational movement of said stop nut.

7. In a cylinder-piston mechanism of the type having a cylinder component with an open end in which a piston component reciprocates and wherein the piston component has a threaded portion that carries a stop nut for adjustable positioning against the cylinder component to stop retraction of the piston component at a selected position, shielding means according to claim 6 and characterized further in that said cylindrical shield members are formed of flexible material in bellows-like expansible folds and in that said annular grooves receive and retain the end folds of said shield members.

References Cited by the Examiner
UNITED STATES PATENTS

| 38,606 | 5/1863 | Rymes | 92—13 X |
| 2,322,010 | 6/1943 | Fowler | 74—18.2 X |
| 2,408,181 | 9/1946 | Simonton | 92—23 X |
| 3,019,663 | 2/1962 | Breunich | 92—34 X |

FOREIGN PATENTS 370,117  2/1923  Germany.

MARTIN P. SCHWADRON, *Primary Examiner.*

EDGAR W. GEOGHEGAN, *Examiner.*

I. C. COHEN, *Assistant Examiner.*